No. 12,446. REISSUED FEB. 6, 1906.

S. B. KIRTLEY.

SELF INDEXING LOOSE LEAF LEDGER.

APPLICATION FILED SEPT. 11, 1905.

2 SHEETS—SHEET 1.

WITNESSES:

E. M. Harrington

M. P. Smith

INVENTOR:

S. B. Kirtley.

By Nigdon & Kougan Attys.

No. 12,446. REISSUED FEB. 6, 1906.

S. B. KIRTLEY.

SELF INDEXING LOOSE LEAF LEDGER.

APPLICATION FILED SEPT. 11, 1905.

2 SHEETS—SHEET 2.

WITNESSES:
E. M. Harrington
M. P. Smith

INVENTOR:
S. B. Kirtley.
By Kigdon & Longan
ATTYS.

UNITED STATES PATENT OFFICE.

SIMEON B. KIRTLEY, OF COLUMBIA, MISSOURI.

SELF-INDEXING LOOSE-LEAF LEDGER.

No. 12,446. Specification of Reissued Letters Patent. Reissued Feb. 6, 1906.

Original No. 767,290, dated August 9, 1904. Application for reissue filed September 11, 1905. Serial No. 278,051.

*To all whom it may concern:*

Be it known that I, SIMEON B. KIRTLEY, a citizen of the United States, residing at Columbia, Boone county, State of Missouri, have invented certain new and useful Improvements in Self-Indexing Loose-Leaf Ledgers or Books, of which the following is a specification containing a full, clear, and exact description, reference being had to the accompanying drawings, forming a part hereof.

This invention relates to self-indexing loose-leaf ledgers or books.

The object of this invention is to provide an improved system of original and transfer loose-leaf self-indexing ledgers or books in which the original may be kept practically of a given size or thickness and in which improved means shall be provided for removing the original leaves from the original ledger when filled and replacing the same by duplicate leaves from the transfer-ledger and which duplicates may themselves be detached from their places in the original book after being filled and they in turn supplanted by duplicate leaves as often as required.

The invention consists in the combination of two or more ledgers or books of the construction recited in the claims and one of which is the original or current ledger and another one of which is a transfer-ledger and each of which has a series of cut-away loose leaves for receiving suitable identification characters upon the exposed portions thereof.

The invention further consists in the details of construction hereinafter shown, described, and claimed.

Figure 1:
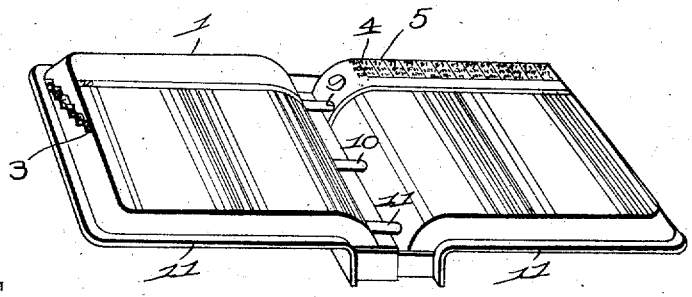
Figure 2:
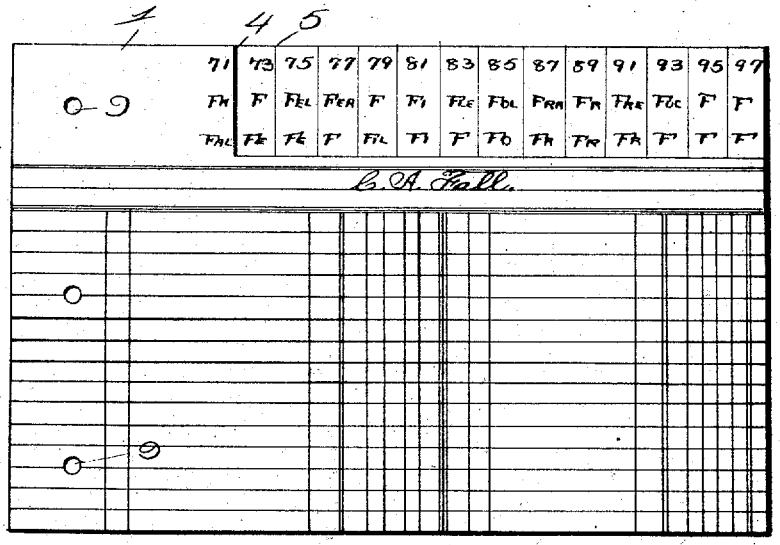
Figure 3:
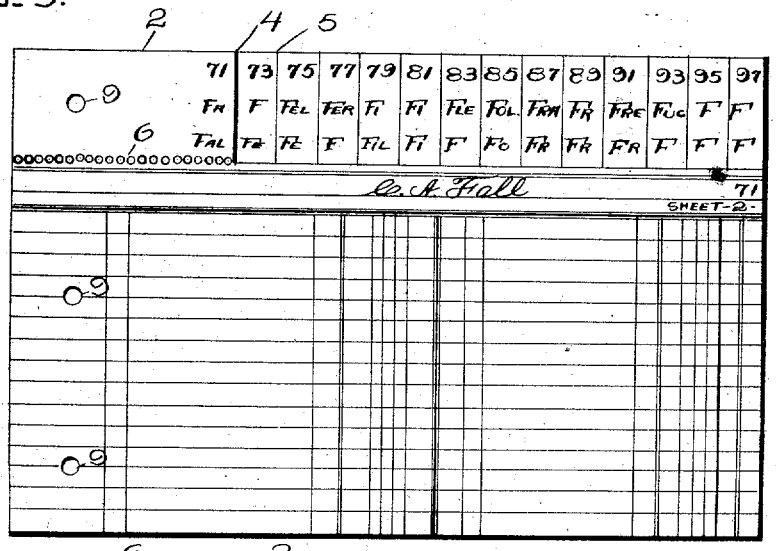
Figure 4:
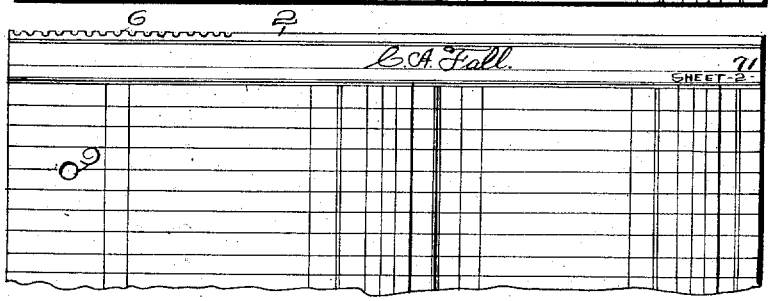
Figure 5:
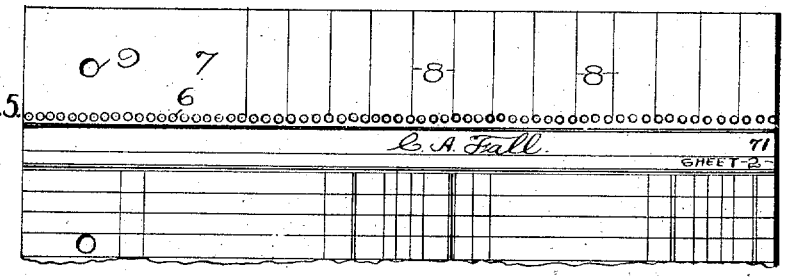

In the drawings, Figure 1 is a perspective view of the original ledger or book. Fig. 2 is a detail view of a series of loose leaves of the original ledger. Fig. 3 is a detail view of a series of loose leaves of the transfer-ledger. Fig. 4 shows the arrangement of the transfer-ledger leaves after the sheet has been removed from its cut-away index and ready to be placed in the transfer-ledger. Fig. 5 is a detail view of a special or extra sheet for the original ledger.

1 indicates the original ledger, and the transfer-ledger is indicated by the numeral 2 and is more clearly shown in Figs. 3 and 4.

Each ledger is preferably indexed alphabetically, as shown, a suitable number of pages being assigned to each letter of the alphabet, the number assigned to each individual letter being in proportion to the frequency of its occurrence and also in proportion to the number of pages in the book. Those letters which are of frequent occurrence, as initial letters, are assigned to a greater number of pages than those which are of rarer occurrence.

The first page of each series of pages assigned to each individual letter is used as an index-page, and each of these index-pages is provided with an index-tab 3, secured, as usual, in any suitable manner to the edge of the sheet and which tabs of course provide also a means by which any individual letter may be turned to with facility at any point within the ledger, or in place of said tabs 3 I may make use of any other ordinary alphabetical index.

The upper end of the second page allotted to each initial letter is cut away, as indicated by 4, thereby making a rectangular excision which extends from a given line to the right-hand edge of the page. This exposes to view the sheet next beneath it, and which is also cut away in the same manner, as indicated by 5, which, however, begins at a suitable distance to the right of the preceding cut-away, thereby exposing to view a part of the said sheet, and upon this exposed portion is preferably printed, as shown, the first, second, and third letters of the names whose accounts are assigned to that particular page. Each succeeding sheet assigned to each particular letter, as an initial letter, is in a like manner cut away, the cut-away in each sheet beginning at a suitable distance to the right of that in the preceding sheet.

Each of the pages is preferably numbered consecutively, as shown, just beneath the cut-away, and the index at the top of each page is also numbered the same as the sheet which carries it; but in many cases I prefer to omit as unnecessary the numbers at the top of the cut-away pages.

In Fig. 1 the ledger is shown opened at the index-letter "F," the first page (70) being full size and devoid of any cut-away. The arrangement of the numbered cut-aways exposes to view each alternate page of the book. For example, the ledger shown in Fig. 1 is opened at page 71, which is the first page-number exposed to view on the cut-away sheet. The second page is 73, the third 75, and so on through the entire number of pages allotted to the letter "F."

At the top of each cut-away sheet are placed the letters which may occur as the first second, and third letters in names having the letter "F" as an initial, the letters being placed in their alphabetical order. For example, the letter "r" is of frequent occurrence as the second letter in names beginning with "F", and "a" is often the third letter. Accordingly, within the blank space beneath the page-number and at the right of the initial "F" are placed the letters "r" "ra," &c., which may occur as the second and third letters of names, as shown on page 87. Letters which do not often occur as the third letter of names are omitted from the sheet as printed, but may be added by the user with a pen. For instance, the letter "y" does not often occur as the third letter, and so it is not shown, but may be written after "Fr" on page 91 to index any name beginning with "Fry." When the second and third letters cannot be anticipated, the initial letter only is printed on the exposed cut-away pages, as shown on pages 73 77 79, &c.

When it is desired to turn to any name beginning with "F," the sheet carrying the index-tab "F" is raised, which exposes to view the initial, second, and third letters of the name, and the account can be quickly found by one movement of the hand.

The sheets of the transfer-ledger only are provided with a horizontal line of perforations 6 near their tops, which divides the cut-away index from the body of the sheet.

When an account in the original ledger has filled up the page or spaces allotted to it, I then proceed as follows: To illustrate: When C. A. Fall's account fills page 71, which I have marked also "Sheet 1" in the original ledger, I remove said sheet from the original ledger and exchange it for a sheet of like number and index taken from the transfer-ledger 2 and place the last-named sheet in the original ledger and mark it "Sheet 2," as shown in Fig. 3. When C. A. Fall's account fills said sheet 2, I then detach the said sheet from the index on the line of perforations 6 and remove this sheet from the ledger and throw away its detached index. After sheet 2 has been removed from the original ledger, as described, it is then placed in the transfer-ledger on top of sheet 1 under the account of C. A. Fall. Said detached sheet is shown clearly in Fig. 4. In case C. A. Fall's account extends over two sheets I provide a special sheet, as indicated by the numeral 7, which I have marked "Sheet 3." This sheet may be devoid of cut-away and printing at the top, as shown in Fig. 5, but is preferably provided with a number of short vertical ruled lines 8. These vertical lines 8 are provided as guides in making any size cut-away that may be required, and the cut-away in the special sheet 7 is made by cutting upon one of the lines 8 downwardly until the horizontal line of perforations 6 is reached, and then the cut-away waste portion should be torn out in order to fit the space that held sheet 2. As this sheet 7 is devoid of an index at the top, I place the same index at its top as is on sheet 2—namely, "71—Fa, Fal." This special sheet can be used for any other name of the alphabet and can be cut away upon any of the lines 8, as previously described, to fit over the desired sheet. I continue the operation of supplying additional special sheets as the length of the account may require.

I do not limit myself to the specific index-letters shown herein, as it is obvious that I may make use of any other identifying characters, such as numerals or vowels, or second and third letters alone, &c.

It may sometimes happen that all the pages have accounts upon them in the original ledger, thereby leaving no space for other accounts that may subsequently occur under that letter. In such a case I insert the special sheet 7 under any desired name in order to carry the additional accounts. Of course the special sheet 7 when placed in the book in the manner last described should be cut back sufficiently far to expose the proper index-letters at the right of the vertical line 8, upon which it has been cut away. For instance, there may occur another account beginning with "Fra," and in such case the special sheet 7 should have the customer's name written upon it and then be placed on the page 87 and cut away, as described, so as to expose the index-letters "Fra" at the right hand of the cut-away line of such special sheet.

Relative to the manner of binding the sheets I would state that I may make use of any of the common temporary bindings now in use, and I have only shown perforations 9 for the passage of the binding devices 10 made use of in connecting the sheets to the backs 11.

I claim—

1. A series of original loose self-indexing sheets having a portion of their edges cut away, and portions of said cut-away sheets being exposed and having suitable identifying characters upon the said exposed portions, in combination with an additional series of transfer-sheets interchangeable with said original sheets and provided with identifying characters the same as those of the original sheets, and having detachable cut-away portions separated from their main bodies by perforated lines, substantially as specified.

2. A series of original loose self-indexing sheets having a portion of their edges cut away, and portions of said cut-away sheets being exposed and having suitable identifying characters upon the said exposed portions, in combination with an additional series of transfer-sheets interchangeable with said original sheets and provided with identifying characters the same as those of the original sheets, and having detachable cut-away portions separable from the bodies of the transfer-sheets by a line of perforations, substantially as specified.

3. A series of original loose self-indexing sheets having a portion of their edges cut away, and portions of said cut-away sheets being exposed and having suitable identifying characters upon the said exposed portions, in combination with an additional series of transfer-sheets interchangeable with said original sheets and provided with identifying characters the same as those of the original sheets, and having detachable cut-away portions separable from the bodies of the transfer-sheets by a line of perforations; extra duplicate perforated transfer-sheets and temporary bindings for all the sheets, substantially as specified.

4. A self-indexing ledger or book, provided with interchangeable loose cut-away leaves for the letters of the alphabet, portions of the said cut-away leaves being exposed, the initial letter with second and third letters of names placed on certain of said exposed portions, and the initial letter placed only with the second letter on certain of said exposed portions, and having a space adjacent thereto for the insertion of the third letter of the names, and the initial being placed alone on certain of said exposed portions and having spaces adjacent thereto for the insertion of the second and third letters of names which cannot be anticipated, different identifying characters on the exposed portions of the different cut-away leaves; and an additional series of interchangeable loose cut-away sheets adapted to be located in a transfer ledger or book and provided with leaves and identifying characters the same as those of the original ledger or book, in combination with a third series of insert blank sheets identical in size and shape with those previously mentioned but devoid of an index, and a fourth series of blank sheets adapted to receive additional or subsequently-occurring accounts and identical with those of the third series, except cut back one step farther so as to expose the first indexed sheet beneath, and also provided with identifying characters to distinguish them from each other, substantially as specified.

5. The combination of two self-indexing loose-leaf ledgers or books, one of which is an original and the other a transfer book each having a separate series of blank sheets which are cut away so as to expose the sheet beneath them, and the sheets of both books provided upon said cut-away portions with corresponding identifying characters, and a third series of insert blank sheets identical in size and shape with those previously mentioned, but devoid of an index, substantially as specified.

6. The combination of two self-indexing loose-leaf ledgers or books, one of which is an original and the other a transfer book each having a separate series of blank sheets which are cut away so as to expose the sheet beneath them, and the sheets of both books provided upon said cut-away portions with corresponding identifying characters, a third series of insert blank sheets identical in size and shape with those previously mentioned but devoid of an index, and a fourth series of blank sheets adapted to receive additional or subsequently-occurring accounts and identical with those of the third series, except cut back one step farther so as to expose the first indexed sheet beneath, and also provided with identifying characters to distinguish them from each other, substantially as specified.

7. The combination of two self-indexing loose-leaf ledgers or books, one of which is an original and the other a transfer book each having a separate series of blank sheets which are cut away so as to expose the sheets beneath them, and the sheets of both books provided upon said cut-away portions with the first letter of the names to be indexed, and having a blank space adjacent thereto for additional characters, the said original book having also a third series of insert blank sheets identical in size and shape with those previously mentioned but devoid of an index, and a fourth series of blank sheets adapted to receive additional or subsequently-occurring accounts and identical with those of the third series, except cut back one step farther so as to expose the first indexed sheet beneath, and also provided with identifying characters to distinguish them from each other, substantially as specified.

8. The combination of two self-indexing loose-leaf ledgers or books, one of which is an original and the other a transfer book each having a separate series of blank sheets which are cut away so as to expose the sheets beneath them, and the sheets of both books provided upon said cut-away portions with the first two letters of the names to be indexed, and having a blank space adjacent thereto for additional characters, the said original book having also a third series of insert blank sheets identical in size and shape with those previously mentioned but devoid of an index, and a fourth series of blank sheets adapted to receive additional or subsequently-occurring accounts and identical with those of the third series, except cut back one step farther so as to expose the first indexed sheet beneath, and also provided with identifying characters to distinguish them from each other, substantially as specified.

9. The combination of two self-indexing loose-leaf ledgers or books, one of which is an original and the other a transfer book each having a separate series of blank sheets which are cut away so as to expose the sheet beneath them, and the sheets of both books provided upon said cut-away portions with the first three letters of the names to be indexed, and having a blank space adjacent thereto for additional characters, the said original book having also a third series of insert blank sheets identical in size and shape with those previously mentioned but devoid of an index, substantially as specified.

10. The combination of two self-indexing loose-leaf ledgers or books, one of which is an original and the other a transfer book each having a separate series of blank sheets which are cut away so as to expose the sheet beneath them, and the sheets of both books provided upon said cut-away portions with the first three letters of the names to be indexed, and having a blank space adjacent thereto for additional characters, the said original book having also a third series of insert blank sheets identical in size and shape with those previously mentioned but devoid of an index, and a fourth series of blank sheets adapted to receive additional or subsequently-occurring accounts and identical with those of the third series, except cut back one step farther so as to expose the first indexed sheet beneath, and also provided with identifying characters to distinguish them from each other, substantially as specified.

11. The combination of two self-indexing loose-leaf ledgers or books, one of which is an original and the other a transfer book each having a separate series of blank sheets which are cut away so as to expose the sheet beneath them, and the sheets of both books provided with the first three letters of the names to be indexed, and having a blank space adjacent thereto for additional characters, a third series of insert blank sheets identical in size and shape with those previously mentioned but devoid of an index, substantially as specified.

12. The combination of two self-indexing loose-leaf ledgers or books, one of which is an original and the other a transfer book each having a separate series of blank sheets which are cut away so as to expose the sheet beneath them, and the sheets of both books provided with the first three letters of the names to be indexed, and having a blank space adjacent thereto for additional characters, a third series of insert blank sheets identical in size and shape with those previously mentioned but devoid of an index, and a fourth series of blank sheets adapted to receive additional or subsequent occurring accounts and identical with those of the third series, except cut back one step farther so as to expose the first index-sheet beneath, and also provided with identifying characters to distinguish them from each other, substantially as specified.

SIMEON B. KIRTLEY.

Witnesses:
E. R. MITCHELL,
ADAM NELSON.